(12) United States Patent
Jones et al.

(10) Patent No.: US 7,829,509 B2
(45) Date of Patent: Nov. 9, 2010

(54) ANNULAR FLUIDS AND METHOD OF EMPLACING THE SAME

(75) Inventors: Andrew G. K. Jones, Houston, TX (US); Bethicia B. Prasek, Houston, TX (US); Robert L. Horton, Sugar Land, TX (US)

(73) Assignee: M.I. L.L.C., Houston, TX (US)

( * ) Notice: Subject to any disclaimer, the term of this patent is extended or adjusted under 35 U.S.C. 154(b) by 719 days.

(21) Appl. No.: 11/069,179

(22) Filed: Mar. 1, 2005

(65) Prior Publication Data

US 2005/0176591 A1 Aug. 11, 2005

Related U.S. Application Data

(63) Continuation of application No. 10/339,216, filed on Jan. 9, 2003, now Pat. No. 6,908,886.

(51) Int. Cl.
*C09K 3/00* (2006.01)

(52) U.S. Cl. .................... 507/216; 507/103; 507/112; 507/139; 536/56; 536/57; 536/58; 536/123.1

(58) Field of Classification Search ............. 536/56–58, 536/123.1; 507/103, 112, 139, 216
See application file for complete search history.

(56) References Cited

U.S. PATENT DOCUMENTS

| | | | |
|---|---|---|---|
| 3,613,792 A | 10/1971 | Hyde et al. | |
| 3,857,443 A | 12/1974 | Cole | |
| 4,566,976 A | 1/1986 | House et al. | |
| 5,062,969 A | 11/1991 | Holtmyer et al. | |
| 5,146,985 A | 9/1992 | Alquie et al. | |
| 5,290,768 A | 3/1994 | Ramsay et al. | |
| 6,342,467 B1 * | 1/2002 | Chang et al. | 507/110 |
| 6,632,779 B1 * | 10/2003 | Vollmer et al. | 507/211 |
| 2004/0011990 A1 * | 1/2004 | Dunaway et al. | 252/62 |

FOREIGN PATENT DOCUMENTS

| | | |
|---|---|---|
| GB | 2 367 315 | 4/2002 |
| WO | WO 2004/025076 A1 | 3/2004 |

OTHER PUBLICATIONS

UK Examination Report Dated Sep. 29, 2005 (25 pages).
International Search Report and Written Opinion for International Application No. PCT/US2004/000456 dated Jul. 14, 2004 (12 pages).
Norwegian Office Action for Norwegian Application No. 2005 3771, mailed on Dec. 28, 2009 (4 pages).

* cited by examiner

*Primary Examiner*—Shaojia Anna Jiang
*Assistant Examiner*—Ganapathy Krishnan
(74) *Attorney, Agent, or Firm*—Osha • Liang LLP

(57) ABSTRACT

An annular fluid or packer fluid, and methods of making the same, that includes a water-miscible solvent, a viscosifying additive, a crosslinking agent, a crosslinking inhibitor having the facility to inhibit crosslinking between the viscosifying additive and the crosslinking agent, and an initiating agent having the facility to overcome an action of the crosslinking inhibitor and to initiate crosslinking between the viscosifying additive and the crosslinking agent, is shown and described. The fluid has a thermal conductivity of no more than about 0.25 btu/(hr·ft·° F.) and a potential to substantially increase its viscosity upon sitting for a selected period of time.

1 Claim, No Drawings

ANNULAR FLUIDS AND METHOD OF EMPLACING THE SAME

CROSS-REFERENCE TO RELATED APPLICATIONS

This application is a continuation of U.S. Pat. application Ser. No. 10/339,216, filed Jan. 9, 2003, and claims the benefit, pursuant to 35 U.S.C. §120, to that application. That application is incorporated by reference in its entirety.

BACKGROUND OF INVENTION

1. Field of the Invention

The invention relates generally to viscosifiable, low thermal conductivity annular fluids and methods of viscosifying, emplacing, and removing the fluids.

2. Background Art

Annular fluids or packer fluids are liquids which are pumped into an annular opening between a casing and a wellbore wall or between adjacent, concentric strings of pipe extending into a wellbore. These fluids are especially necessary in oil or gas well construction operations conducted in low temperature venues of the world, for example, those areas having permafrost. Permafrost is a thick layer of frozen surface ground which may be several hundred feet thick and presents a great obstacle to the removal of relatively warm fluids through a well pipe. Particularly, warm fluid in the well pipe causes thawing of the permafrost in the vicinity of the well resulting in subsidence which can impose compressive and/or tension loads high enough to rupture or collapse the well casing and hence allow the escape of well fluids. In addition, the warm gas or oil coming to the surface in the well pipe becomes cooled by giving up its heat to the permafrost. Further, gas hydrate crystals may form, which can freeze together and block the well pipe. Generally, except for a tiny contribution from radiation, annular heat loss is due to convection and to conduction.

Heavy oil production is another operation which often can benefit from the use of an insulating annular fluid. In heavy oil production, a high-pressure steam or hot water is injected into the well and the oil reservoir to heat the fluids in the reservoir, causing a thermal expansion of the crude oil, an increase in reservoir pressure and a decrease of the oil's viscosity. In this process, damage to the well casing may occur when heat is transferred through the annulus between the well tubing and the casing. The resulting thermal expansion of the casing can break the bond between the casing and the surrounding cement, causing leakage. Accordingly, an insulating medium such as a packer fluid may be used to insulate or to help insulate the well tubing. The packer fluid also reduces heat loss and saves on the energy requirements in steam flooding.

In addition to steam injection processes and operations which require production through a permafrost layer, subsea fields—especially, subsea fields in deep water, 1,500 to more than 6,000 feet deep—require specially designed systems which typically require a packer fluid. For example, a subsea oil reservoir temperature may be between about 120° F. and 250° F., while the temperature of the water through which the oil must be conveyed is often as low as 32° F. to 50° F. Conveying the high temperature oil through such a low temperature environment can result in oil temperature reduction and consequently the separation of the oils into various hydrocarbon fractions and the deposition of paraffins, waxes, asphaltenes, and gas hydrates. The agglomeration of these oil constituents can cause blocking or restriction of the wellbore, resulting in significant reduction or even catastrophic failure of the production operation.

To meet the above-discussed insulating demands, a variety of packer fluids have been developed. For example, U.S. Pat. No. 3,613,792 describes an early method of insulating wellbores. In the U.S. Pat. No. 3,613,792 patent, simple fluids and solids are used as the insulating medium. U.S. Pat. No. 4,258,791 improves on these insulating materials by disclosing an oleaginous liquid such as topped crude oils, gas oils, kerosene, diesel fluids, heavy alkylates, fractions of heavy alkylates and the like in combination with an aqueous phase, lime, and a polymeric material. U.S. Pat. No. 4,528,104 teaches a packer fluid comprised of an oleaginous liquid such as diesel oil, kerosene, fuel oil, lubricating oil fractions, heavy naphtha and the like in combination with an organophillic clay gellant and a clay dispersant such as a polar organic compound and a polyfunctional amino silane. U.S. Pat. No. 4,877,542 teaches a thermal insulator fluid consisting of a heavy mineral oil as the major liquid portion, a light oil as a minor liquid portion, a smectite-type clay, calcium oxide and hydrated amorphous sodium silicate. U.S. Pat. No. 5,290,768 teaches a thixotropic composition containing ethylene glycol and welan gum. The above-discussed patents are herein incorporated by reference.

Although many of the above-described packer fluids function adequately, they fail to meet industrial and governmental concerns for the environment. Particularly, many of the constituents of the above-described packer fluids are unacceptable from an environmental standpoint and are often prohibited for use by government regulation. For example, the mineral oils and heavy crude oils required by several of the above-discussed patents are not permitted for use in areas such as the Gulf of Mexico.

Further attempts at providing insulating annular fluids based on fluids having a more acceptable HSE profile are discussed in G.B. Patent 2,367,315 by Vollmer (hereinafter referred to as "Vollmer '315"). Nothing is taught about insulating annular fluids in U.S. Pat. No. 5,304,620 by Holtmyer, et al. (hereinafter referred to as "Holtmyer '620"), U.S. Pat. No. 5,439,057 by Weaver, et al. (hereinafter referred to as "Weaver '057"), and U.S. Pat. No. 5,996,694 by Dewprashad, et al. (hereinafter referred to as "Dewprashad '694"). However, Holtmyer '620, Weaver '057, and Dewprashad '694 discuss the viscosification of brines using crosslinked hydroxyethylcellulose derivatives. These patents are hereby incorporated by reference.

What is needed, however, are insulating packer fluids that are very low in thermal conductivity while simultaneously meeting all of the other constraints imposed upon the packer fluids and are easier to pump, yet become more viscous than conventional fluids when the insulating packer fluids are resident in situ within the annular space or one of the annular spaces in an oil or gas well.

SUMMARY OF INVENTION

In one aspect, the present invention relates to a packer fluid that includes a water-miscible solvent, a viscosifying additive, a crosslinking agent having the facility to crosslink the viscosifying additive, a crosslinking inhibitor adapted to inhibit crosslinking between the viscosifying additive and the crosslinking agent, and an initiating agent having the facility to overcome an action of the crosslinking inhibitor and to initiate crosslinking between the viscosifying additive and the crosslinking agent. In a particular aspect, the packer fluid has a thermal conductivity of no more than about 0.25 btu/

(hr·ft·° F.), and a potential to substantially increase its viscosity upon sitting for a selected period of time.

In another aspect, the present invention relates to a method for preparing a packer fluid that includes mixing a water-miscible solvent and a viscosifying additive to produce a first fluid, acidifying the first fluid with an acid to produce a second fluid, adding a crosslinking agent to the second fluid to produce a third fluid, and adding an initiating agent to the third fluid to permit crosslinking between the viscosifying additive and the crosslinking agent.

In another aspect, the present invention relates to a method for emplacing a packer fluid into an annulus that includes preparing a packer fluid, pumping the packer fluid into the annulus before the selected period of time, and allowing the packer fluid to sit in the annulus such that the viscosity of the packer fluid is substantially increased.

Other aspects and advantages of the invention will be apparent from the following description and the appended claims.

DETAILED DESCRIPTION

In one aspect, the present invention relates to insulating packer fluids, and methods of emplacing and subsequently removing such fluids. Packer fluids according to the present invention have very low thermal conductivities, while simultaneously meeting other constraints (e.g., regulatory or environmental constraints) imposed upon the packer fluids. These fluids are facile to pump, yet are capable of becoming very viscous after they are resident in situ within the annular space or one of the annular spaces in an oil or gas well.

As noted above, a majority of annular heat loss is due to convection and conduction. Heat loss due to convection can be arrested or substantially diminished by increased viscosities of the fluids. On the other hand, heat loss due to thermal conductivity needs to be controlled by proper selection of fluids.

Prior art packer fluids often are oil-based (hydrocarbon-based) because oil-based fluids typically have very low thermal conductivities. For example, thermal conductivities as low as 0.07 btu/(hr·ft·° F.) can be obtained with gelled diesel or other hydrocarbon-based insulating annular fluid. As noted above, these fluids typically have adverse environmental effects and are not desirable. Therefore, water-based and water-miscible fluids are, in many cases, preferred in spite of the fact that water-based fluids typically have much higher thermal conductivities because water has a thermal conductivity of 0.351 btu/(hr·ft·° F.). The thermal conductivities, $\lambda$, of a wide variety of aqueous fluids, including water, can be approximated to within about ±8% as follows:

$$\lambda[\text{btu}/(\text{hr·ft·° F.})] = -0.16262 \cdot \rho + 0.51929$$

$$\text{Or } \lambda[\text{Watts}/(\text{cm·° C.})] = -281.45 \times 10^{-5} \cdot \rho + 898.76 \times 10^{-5}$$

where $\rho$=the fluid density, in $\text{gm/cm}^3$

While most aqueous solutions have thermal conductivities as predicted by this equation, some exceptions do exist. For example, concentrated sulfuric acid (90%) has a thermal conductivity that is 8.8% below the predicted value, and a 30% dilute sulfuric acid has a thermal conductivity that is 16.5% below the predicted value. Similarly, thermal conductivities of concentrated sucrose solutions fall substantially below the predicted values (up to about 29% below the predicted values). The same phenomenon is also observed with non-aqueous water-miscible solutions such as ethylene glycol, propylene glycol, and solutions of various salts such as calcium bromide in ethylene glycol or propylene glycol. These solutions can have thermal conductivities that are as much as 60% lower than the predicted values.

For example, ethylene glycol has a $\rho$ of 1.1108 $\text{gm/cm}^3$ and a $\lambda$ of 0.149 btu/(hr·ft·° F.), substantially lower than the predicted value of $\lambda$=0.339 btu/(hr·ft·° F.) based on its density. Similarly, a solution of 139 ppb calcium bromide in ethylene glycol has a $\rho$ of 1.388 $\text{gm/cm}^3$ and a $\lambda$ of 0.133 btu/(hr·ft·° F.), substantially lower than the predicted value of $\lambda$=0.294 btu/(hr·ft·° F.) based on its density. For comparison, similar calcium bromide brines (i.e., in water instead of ethylene glycol) have $\lambda$ values of 0.34 and 0.30 btu/(hr·ft·° F.), respectively, when the densities are 1.1108 $\text{gm/cm}^3$ and 1.388 $\text{gm/cm}^3$. Because the ethylene glycol-based fluids have low thermal conductivity and are relatively environmentally friendly, the applicability of these and related fluids as insulating annular fluids was investigated by the present inventors.

Embodiments of the present invention relate to low thermal conductivity annular fluids based on water-miscible fluids (e.g., various glycols), which have been formulated to have the desired Theological properties. Specifically, these annular fluids are formulated to have certain viscosities for facile pumping of these fluids into an annular space. However, they will develop substantially increased viscosities in situ after they have been emplaced in the annular space. In other words, these fluids have delayed viscosifying properties. Various formulations of fluids within the scope of the present invention are provided below as examples. However, the present invention is not limited to the described embodiments, but is bounded by the claims that follow.

EXAMPLE 1

A fluid having a density of 9.86 ppg and a $\lambda$ of about 0.14 btu/(hr·ft·° F.) was formulated from the following components:

| | | |
|---|---|---|
| 1. Ethylene glycol | 322.87 gm | 78.0% by wt. |
| 2. ECF 680 | 16.8 gm | 4.1% by wt. |
| 3. Concentrated HCl | 2.38 gm | 0.6% by wt. |
| 4. CaCl$_2$ (dry) | 70.0 gm | 16.9% by wt. |
| 5. MgO | 2.0 gm | 0.5% by wt. |

ECF 680 is a slurry of a doubly derivatized hydroxyethyl cellulose (DDHEC) in an inert, water-miscible carrier fluid. ECF 680 is available commercially from M-I L.L.C. (Houston, Tex.). DDHEC may be synthesized by grafting monomers of vinyl phosphonic acid (VPA) onto cellulose polymers according to methods disclosed in U.S. Pat. No. 5,304,620 (Holtmyer '620).

The components were added in the order listed in the table. The first two components, ethylene glycol and ECF 680, were mixed and stirred together for about 1 hour to thoroughly disperse the polymer in the ethylene glycol. Then, 2.38 grams of concentrated (~38.5 wt %) hydrochloric acid were added and stirring was continued for about 30 minutes. The mixture was set aside and its viscosity was observed over the course of 4 hours. At first, the viscosity was approximately that of ethylene glycol, but after about 2 hours, the viscosity increased substantially, to about 300 cP when measured at 200 rpm on a Fann 35A viscometer.

Next, dry calcium chloride was added, liberating heat as the solid dissolved in the mixture. The calcium chloride was added in a controlled fashion, to avoid thermally degrading the DDHEC. After the mixture had cooled to room temperature, the viscosity was measured again to be about 300 cP when measured at 200 rpm on a Fann 35A viscometer. Finally, the magnesium oxide, in the form of a moderately reactive solid product (e.g., moderately fine powder), was added as a slurry in a few grams of ethylene glycol.

It has been discovered that magnesium oxide neutralizes the acid and raises the pH to the 8-9 range, whereupon divalent or multi-valent cations (e.g., $Ca^{2+}$) already present in the mixture crosslink DDHEC. Alternatively, other polymers similar to DDHEC could be used (e.g., similarly modified cellulose, guar, or hydroxypropyl guar), and the multi-valent or divalent cations may be added separately. Also, it will be obvious to one skilled in the art that other methods may be used to effect the same result—for example, applying a mildly complexed crosslinkant which becomes slowly un-complexed in order to effect the initial crosslinking, and subsequently applying a stronger complexing additive to effect the breaking (un-crosslinking).

The crosslinking does not occur immediately, but instead occurs over the course of several hours, leading to doubling of the apparent viscosity of the mixture during these several hours and gradually increasing to about 50 percent of its ultimate value upon sitting overnight at room temperature. Only after sitting at room temperature for several days did the mixture achieve its ultimate viscosity, that of a semi-rigid gel. The delayed viscosifying property of this embodiment permits facile emplacement of this fluid into an annular space, while the ultimate viscosity of this fluid is desirable for arresting or substantially reducing heat loss due to convection.

EXAMPLE 2

Because the embodiment of Example 1 has desirable properties for use as an annular fluid, the process of initiating polymer crosslinking by addition of MgO is investigated in more detail. In the second example, a fluid having a density of 9.86 ppg and a λ of about 0.14 btu/(hr·ft·° F.) was formulated similarly to Example 1, except that the magnesium oxide was not added as a slurry in ethylene glycol but as a dry powder. The magnesium oxide was found to be able to disperse thoroughly throughout the mixture without causing any locally high pH pocket that might lead to premature crosslinking. As in Example 1, the crosslinking occurred over the course of several hours, leading to an increase in the viscosity.

EXAMPLE 3

Next, the fineness of the MgO powder is investigated. In the third embodiment, a fluid having a density of 9.86 ppg and a λ of about 0.14 btu/(hr·ft·° F.) was formulated similarly to Example 1, except that the magnesium oxide was a very fine powder in a highly reactive form, i.e., having small particle size, high surface area, and ready accessibility for reaction. One example of such a fine powder MgO is available commercially from M-I L.L.C under the trade name of Di-Balance™. The fine powder MgO was added as a slurry in ethylene glycol. The magnesium oxide was found to be able to disperse thoroughly throughout the mixture without causing any locally high pH pocket that might lead to premature crosslinking. As in Example 1, the crosslinking occurred over the course of several hours, leading to an increase in the viscosity.

The above examples show that crosslinking may be initiated with the addition of MgO in various forms.

EXAMPLE 4

In the above examples, the divalent cation ($Ca^{2+}$) is prevented from crosslinking DDHEC by the addition of acid (HCl). Subsequent addition of MgO counters the effect of HCl and allows the crosslinking to take place. Surprisingly, the order of the addition of the divalent cation and the acid has a dramatic effect on the ability of the resultant fluid to viscosify, as evidenced by the following example. In this example, a fluid having a density of 9.86 ppg and a λ of about 0.14 btu/(hr·ft·° F.) was formulated from the same components as in Example 1, but in the following order:

| | |
|---|---|
| 1. Ethylene glycol | 322.87 gm |
| 2. ECF 680 | 16.8 gm |
| 3. $CaCl_2$ (dry) | 70.0 gm |
| 4. Concentrated HCl | 2.38 gm |
| 5. MgO | 2.0 gm |

The components were added in the order listed in the table. The first two components (ethylene glycol and ECF 680) were mixed and stirred together for about 1 hour to thoroughly disperse the polymer into the ethylene glycol. Then the dry calcium chloride was added, liberating heat as the solid dissolved in the mixture. The calcium chloride was added in a controlled manner to prevent the temperature from rising high enough to thermally degrade the DDHEC.

After the mixture had cooled to room temperature, it was observed to be only slightly more viscous than ethylene glycol. Next, 2.38 grams of concentrated (~38.5 wt %) hydrochloric acid were added and stirring was continued for about 30 minutes. The mixture was then set aside and its viscosity was observed over 4 hours. After 4 hours, the viscosity had not increased substantially, indicating that the DDHEC had been inhibited from properly hydrating in the ethylene glycol fluid due to the presence of calcium chloride prior to the addition of the acid.

Finally, magnesium oxide, in the form of a highly reactive solid product, for example, that is available commercially from M-I L.L.C., was added. However, unlike in Example 1, the viscosity of the mixture only increased very slowly and only to a relatively small extent. Only after sitting at room temperature for several days did the mixture achieve its ultimate viscosity.

Even after reaching its ultimate viscosity, the fluid could still be readily poured from one container to the next, whereas the fluid of Example 1 at a comparable point in time had become a semi-rigid gel which could not be poured. This embodiment demonstrates that the order of addition of the components is important, and it is preferred that acid be added before the addition of the divalent cation.

EXAMPLE 5

Annular fluids of the above examples thicken by crosslinking action between DDHEC and $Ca^{2+}$. Thus, it is expected that the counter anion of the calcium salt should not have much effect. This is shown to be the case in the following example. In this example, a fluid having a density of 10.8 ppg and a λ of about 0.20 btu/(hr·ft·° F.) was formulated as follows:

1. 120.92 gms. of calcium bromide brine (about 52 wt % $CaBr_2$) (26.7% by wt.)

2. 29.08 gms. of water (6.4% by wt.)
3. 10.0 gms. of ethylene glycol (2% by wt.)
4. 16.8 gms. of ECF 680 (3.7% by wt.)

Note that calcium bromide substitutes for calcium chloride in this formulation. The reagents were added in the above order. The mixture was then stirred for about 30 minutes. To this mixture, the following was added:

5. 2.38 gms. (2.0 ml) of concentrated HCl (0.5% by wt.)

The mixture was stirred until it thickened significantly, then it was put aside for ~1 hour. While the above mixture was sitting, in a second jar the following was mixed:

6. 235.77 gms. of ethylene glycol (52.2% by wt.)
    7. 36.74 gms. of calcium bromide (dry) (8.1% by wt.)

A detectable increase in heat resulted upon the addition of the calcium bromide to the ethylene glycol. The mixture in the second jar was stirred while the mixture first heated, then cooled (step 7). When the product of step 7 had cooled to room temperature, 8.0 grams of the solution was removed. To the removed 8.0 grams of solution, the following was added (step 8):

8. 2.0 gms. of MgO. (0.4% by wt.)

While the 2 grams of MgO was being mixed with the 8.0 grams of solution (step 8), the rest of the product from step 7 was rapidly mixed into the thick slurry produced in step 5 (step 9).

When these two fluids were thoroughly mixed, at least 95% of the slurry from step 8 was mixed into the product of step 9 (step 10).

The product of step 10 was then set aside so that the crosslinking reaction could proceed. Crosslinking did not occur immediately, but over the course of several hours, leading to the doubling of the apparent viscosity of the mixture during these several hours. The apparent viscosity of the mixture gradually increased to about 50 percent of its ultimate value upon sitting overnight at room temperature. Only after sitting at room temperature for several days did the mixture achieve its ultimate viscosity, that of a semi-rigid gel.

In this example, calcium bromide is added in a form with some water, which allows the acidified polymer to hydrate and yield fully even in the presence of a substantial concentration of salt. Results from this example show that calcium bromide may be used instead of calcium chloride without appreciable changes in the fluid viscosity.

EXAMPLE 6

In the above example, calcium bromide was added partly as a brine and partly as a dry powder. The following example shows that relative proportions of these two forms of calcium bromide do not have significant effects on the resultant fluid properties. In this example, a fluid having a density of 10.8 ppg and a λ of about 0.20 btu/(hr·ft·° F.) was formulated as follows:

1. 90.69 gms. of calcium bromide brine (about 52 wt % $CaBr_2$) (20% by wt.)
    2. 21.81 gms. of water (4.8% by wt.)
    3. 100.0 gms. of ethylene glycol (22% by wt.)
    4. 16.8 gms. of ECF 680 (3.7% by wt.)

The reagents were added in the above order. The mixture was then stirred for about 30 minutes. To this mixture, the following was added (step 5):

5. 2.38 gms. (2.0 ml) of concentrated HCl (0.5% by wt.)

The mixture was stirred until it thickened significantly, then was put aside for ~1 hour. While the above mixture was sitting, in a second jar the following was mixed:

6. 168.56 gms. of ethylene glycol (39.2% by wt.)
    7. 51.48 gms. of calcium bromide (dry) (i.e., additional $CaBr_2$ to that of step 1). (11.3% by wt.)

A detectable increase in heat resulted upon the addition of the calcium bromide to the ethylene glycol. The mixture in the second jar was stirred while the mixture first heated, then cooled (step 7). When the product of step 7 had cooled to room temperature, 8.0 grams of the solution was removed. To the removed 8.0 grams of solution, the following was added (step 8):

8. 2.0 gms. of MgO. (0.4% by wt.)

While the magnesium oxide was becoming wetted with the 8.0 grams of solution, the remaining product of step 7 was mixed into the thick slurry produced in step 5 (step 9). When these two fluids were thoroughly mixed, at least 95% of the slurry from step 8 was mixed into the rapidly mixed product of step 9 (step 10).

The product of step 10 was then set aside so that the crosslinking reaction could proceed. Crosslinking did not occur immediately, but over the course of several hours, leading to the doubling of the apparent viscosity of the mixture during these several hours. The apparently viscosity of the mixture gradually increased to about 50 percent of its ultimate value upon sitting overnight at room temperature. Only after sitting at room temperature for several days did the mixture achieve its ultimate viscosity, that of a semi-rigid gel. This example shows that relative proportions of calcium bromide used have no significant effect on the ultimate viscosity of the fluid.

EXAMPLE 7

In embodiments of the invention, ultimate viscosities of the annular fluids result from crosslinking DDHEC by the divalent ions. Thus, it is expected that the amounts of DDHEC in these fluids should have significant effects on the final viscosities of the fluids. The following two examples illustrate the effects of the DDHEC concentrations on the viscosities of the resultant fluids. A fluid having a similar density and thermal conductivity as those in examples 5 and 6, i.e., density of 10.8 ppg and a λ of about 0.20 btu/(hr·ft·° F.), was formulated as follows:

1. 90.69 gms. of calcium bromide brine (20% by wt.)
    2. 21.81 gms. of water (4.8% by wt.)
    3. 100.0 gms. of ethylene glycol (22% by wt.)
    4. 12.6 gms. of ECF 680 (i.e., only 75% of that used in Example 6) (2.8% by wt.)

The reagents were added in the above order. The mixture was then stirred for about 30 minutes. To this mixture, the following was added (step 5):

5. 2.38 gms. (2.0 ml) of concentrated HCl (0.5% by wt.)

The mixture was stirred until it thickened significantly, then was put aside for ~1 hour. While the above mixture was sitting, in a second jar the following was mixed:

6. 172.70 gms. of ethylene glycol (38% by wt.)
    7. 51.53 gms. of calcium bromide (dry) (11.3% by wt.)

A detectable increase in heat resulted upon the addition of the calcium bromide to the ethylene glycol. The mixture in the second jar was stirred while the mixture first heated, then cooled (step 7). When the product of step 7 had cooled to room temperature, 8.0 grams of the solution was removed. To the removed 8.0 grams of solution, the following was added (step 8):

8. 2.0 gms. of MgO. (0.4% by wt.)

While the magnesium oxide was becoming wetted with the 8.0 grams of solution, the remaining product of step 7 was mixed into the thick slurry produced in step 5 (step 9). When these two fluids were thoroughly mixed, at least 95% of the slurry from step 8 was mixed into the product of step 9 (step 10). The product of step 10 was then set aside so that the crosslinking reaction could proceed.

Crosslinking did not occur immediately, but over the course of several hours. The crosslinking did not lead to the doubling of the apparent viscosity of the mixture during these several hours, but to a substantially increased viscosity. Gradually the viscosity of the mixture increased to about 50 percent of its ultimate value upon sitting overnight at room temperature, but to a somewhat lesser value than that in Example 6. Only after sitting at room temperature for several days did the mixture achieve its ultimate viscosity, that of a weakly rigid gel. This example shows that the ultimate viscosity of the fluid is lower when DDHEC is reduced by 25%.

EXAMPLE 8

This example investigates the effect of further reduction in DDHEC on the ultimate viscosity of the fluid. Accordingly, a fluid having a density of 10.8 ppg and a $\lambda$ of about 0.20 btu/(hr·ft·° F.) was formulated as follows:

1. 90.69 gms. of calcium bromide brine (20% by wt.)
2. 21.81 gms. of water (4.8% by wt.)
3. 100.0 gms. of ethylene glycol (22% by wt.)
4. 8.4 gms. of ECF 680 (i.e., only 50% of that used in Example 6) (1.9% by wt.)

The reagents were added in the above order. The mixture was then stirred for about 30 minutes. To this mixture, the following was added (step 5):

5. 2.38 gms. (2.0 ml) of concentrated HCl (0.5% by wt.)

The mixture was stirred until it thickened significantly, then was put aside for ~1 hour. While the above mixture was sitting, in a second jar the following was mixed:

6. 176.85 gms. of ethylene glycol (39% by wt.)
7. 51.58 gms. of calcium bromide (dry) (11.3% by wt.)

A detectable increase in heat resulted upon the addition of the calcium bromide to the ethylene glycol. The mixture in the second jar was stirred while the mixture first heated, then cooled (step 7). When the product of step 7 had cooled to room temperature, 8.0 grams of the solution was removed. To the removed 8.0 grams of solution, the following was added (step 8):

8. 2.0 gms. of MgO. (0.4% by wt.)

While the magnesium oxide was becoming wetted with the 8.0 grams of solution, the remaining product of step 7 was mixed into the thick slurry produced in step 5.

When these two fluids were thoroughly mixed, at least 95% of the slurry from step 8 was mixed into the product of step 9 (step 10). The product of step 10 was then set aside so that the crosslinking reaction could proceed.

Crosslinking did not occur immediately, but over the course of several hours. The crosslinking did not lead not to the doubling of the apparent viscosity of the mixture during these several hours, but to a substantially increased viscosity. Gradually the viscosity of the mixture increased to about 50 percent of its ultimate value upon sitting overnight at room temperature, but to a lesser value than that in Example 6. Only after sitting at room temperature for several days did the mixture achieve its ultimate viscosity, that of a weak but "lipping" gel. This example and Example 7 clearly show that ultimate viscosities of these fluids are dependent on the concentrations of DDHEC.

EXAMPLE 9

Next, the effects of different salts are examined. A fluid having a density of 10.8 ppg and a $\lambda$ of about 0.16 btu/(hr·ft·° F.) was formulated from the following components:

| 1. Ethylene glycol | 335.55 gm | 74.0% by wt. |
| 2. ECF 680 | 16.8 gm | 3.7% by wt. |
| 3. Concentrated HCl | 2.38 gm | 0.5% by wt. |
| 4. NaBr (dry) | 96.89 gm | 21.3% by wt. |
| 5. MgO | 2.0 gm | 0.4% by wt. |

This embodiment has a similar composition as that of Example 1, except that sodium bromide is used instead of calcium bromide. The components were added in the order listed above. The first two components were mixed and stirred together for about 1 hour to thoroughly disperse the polymer into the ethylene glycol. Then 2.38 grams of concentrated (~38.5 wt %) hydrochloric acid were added, and stirring was continued for about 30 minutes. The mixture was set aside and its viscosity was observed over the ensuing 4 hours. At first the viscosity was approximately that of ethylene glycol, but after about 2 hours the viscosity increased substantially to about 300 cP when measured at 200 rpm on a Fann 35A viscometer.

Next, dry sodium bromide was added (no significant liberation of heat was observed). Finally, the magnesium oxide, for example, in the form of a highly reactive solid product available commercially from M-I L.L.C., was added. As in Example 1, over the course of several hours the apparent viscosity of the mixture doubled and gradually increased to about 50 percent of its ultimate value upon sitting overnight at room temperature. Only after sitting at room temperature for several days did the mixture achieve its ultimate viscosity, which is substantially the same as that of Example 1. This example shows that substituting sodium ions for the divalent calcium ions did not result in any appreciable change in the ultimate viscosity of the fluid. While the exact mechanism is not clear, it is possible that the added MgO provides sufficient divalent cations for the crosslinking.

EXAMPLE 10

As noted above, the order of the addition of calcium bromide and hydrochloric acid has a significant impact on the ultimate viscosity of the fluid (see Example 4). The effect of reversing the addition of sodium bromide and hydrochloric acid is investigated in the following example. A fluid having a density of 10.8 ppg and a $\lambda$ of about 0.16 btu/(hr·ft·° F.) was formulated from the following components:

| 1. Ethylene glycol | 335.55 gm | 74.0% by wt. |
| 2. ECF 680 | 16.8 gm | 3.7% by wt. |
| 3. NaBr (dry) | 96.89 gm | 21.3% by wt. |
| 4. Concentrated HCl | 2.38 gm | 0.5% by wt. |
| 5. MgO | 2.0 gm | 0.4% by wt. |

This composition comprises identical components in the same amounts as those in Example 9. The components were added in the order listed above. The first two components were mixed and stirred together for about 1 hour to thoroughly disperse the polymer into the ethylene glycol. Then dry sodium bromide was added (no significant liberation of heat was observed). Next, 2.38 grams of concentrated (~38.5 wt %) hydrochloric acid were added, and stirring was continued for about 30 minutes.

The mixture was set aside and its viscosity was observed over the ensuing 4 hours. At first the viscosity was approximately that of ethylene glycol, but after about 2 hours the viscosity had increased substantially to about 80 cP when measured at 200 rpm on a Fann 35A viscometer. Finally, the magnesium oxide, for example, in the form of a highly reactive solid product available commercially from M-I L.L.C., was added. Unlike Example 9, the viscosity of the mixture only increased very slowly and to a lesser extent. Only after sitting at room temperature for several days did the mixture achieve its ultimate viscosity, that of a relatively weak gel, whereas the fluid of Example 9 at a comparable point in time had become a semi-rigid gel which could not be poured.

Like Example 4, this example shows that the order of addition of the components is important, and, for best results, the salt (e.g., sodium bromide or calcium bromide) addition should be delayed until after the acid has been added. However, unlike in the case of calcium chloride addition (e.g., example 4), the salt and sodium bromide did not completely inhibit the hydration, yielding, and subsequent crosslinking of the polymer.

EXAMPLE 11

The above examples show that embodiments of the invention gradually thicken at room temperature over time. When these fluids are actually emplaced in an annular space, they might experience significantly higher temperatures. Therefore, the ability of these fluids to thicken at a higher temperature is investigated. A fluid having a density of 9.86 ppg and a λ of about 0.14 btu/(hr·ft·° F.) was formulated from the following components:

| | | |
|---|---|---|
| 1. Ethylene glycol | 322.87 gm | 78.0% by wt. |
| 2. ECF 680 | 16.80 gm | 4.1% by wt. |
| 3. Concentrated HCl | 2.38 gm | 0.5% by wt. |
| 4. CaCl$_2$ (dry) | 70.0 gm | 16.9% by wt. |
| 5. MgO | 2.00 gm | 0.5% by wt. |

This composition is identical to that of Example 1. The components were also added in the same order as in Example 1, i.e., as listed above. The components were mixed as described in Example 1. However, after the magnesium oxide was added, the fluid was not allowed to sit overnight at room temperature to crosslink. Instead, the mixture was placed in a 180° F. oven for one hour, taken out and cooled to room temperature, and its viscosity was assessed. At this point, the viscosity had visibly increased, indicating the onset of crosslinking. However, at this point, the fluid was still readily pourable from one container to another.

The mixture was placed in a 180° F. oven for another hour, taken out and cooled to room temperature, and its viscosity was assessed. At this point, the gel had become very weakly "lipping" and could only be poured very slowly from one container to another. Finally, the mixture was placed in a 180° F. oven for two additional hours, taken out and cooled to room temperature, and its viscosity was assessed. At this point, the gel had become strongly "lipping." Only after sitting at room temperature overnight did the mixture achieve its ultimate viscosity, that of a semi-rigid gel. This example shows that higher temperatures would not impede the thickening process. On the contrary, it may speed up the thickening process. Accordingly, the temperature factor may need to be taken into account in emplacing the fluids of the present invention.

The above examples show that embodiments of the invention can provide packer fluids or annular fluids which have low thermal conductivities, can be pumped easily, and will become substantially viscosified upon emplacement, whereupon they will become substantially incapable of conducting heat through convection, and consequently will have low total heat-loss.

Embodiments of the invention use water miscible glycols to formulate fluids with low thermal conductivities. Although the examples use ethylene glycols, one of ordinary skill in the art would appreciate that other glycols (e.g., diethylene glycol, triethylene glycol, tetraethylene glycol, propylene glycol, dipropylene glycol, tripropylene glycol, tetrapropylene glycol, and the like), alcohol-glycol ethers (e.g., ethylene glycol monobutyl ether, methyl diethylene glycol, ethyl triethylene glycol, propyl tetraethylene glycol, ethyl propylene glycol, methyl dipropylene glycol, propyl tripropylene glycol, and the like), or alcohols may be used without departing from the scope of the invention. In addition, a mixture of such water miscible solvents may be used. The exact concentrations of the water miscible solvents may depend on the desired thermal conductivities and the type of water miscible solvents. In the above examples, ethylene glycol is used at a concentration of 54%-78% by weight in the final fluids. These fluids have thermal conductivities of 0.2 btu/(hr·ft·° F.) or less. In examples 5-8, up to about 10% by weight of water is included, while ethylene glycol is present at about 54%-61% by weight. These fluids, nevertheless, have relatively low thermal conductivities (about 0.2 btu/(hr·ft·° F.)).

In the above examples, doubly derivatized hydroxyethyl cellulose (DDHEC) is used to thicken the fluids. The derivatization is by reacting HEC with vinyl phosphonic acid. One of ordinary skill in the art would appreciate other similar polymers may be used, such as derivatized hydroxypropyl cellulose or derivatized cellulose. These polymers thicken upon crosslinking with divalent or polyvalent ions. Other polymers that thicken by different mechanisms may also be used. For example, guars or celluloses, with or without derivatization, may be crosslinked with boron, titanium, or zirconium. DDHEC may be conveniently used in a slurry form, such as that sold under the trade name of ECF 680™ by M-I, L.L.C. (Houston, Tex.).

The amounts of DDHEC used in the above examples range from about 1.9% to about 3.7% by weight of ECF 680™. The ultimate viscosities of the fluids depend upon the amounts of DDHEC used. The above examples clearly show that high viscosities (e.g., that of a semi-solid) can be achieved at a DDHEC concentration of about 3.7% by weight of ECF 680™. Even at lower concentrations of DDHEC, appreciable thickening of the fluids was achieved.

The divalent or polyvalent ions that crosslink DDHEC or the like may come from salts (e.g., CaBr$_2$) that are present in the fluids before a Lewis base or a Bronsted-Lowry base (e.g., MgO) is added to initiate the crosslinking, or from the Lewis base or a Bronsted-Lowry base (e.g., MgO) itself. While MgO is used in the above examples, one of ordinary skill in the art would appreciate that other Lewis base or a Bronsted-Lowry base, such as BaO, CaO, or the like, may be used without departing from the scope of the invention. In addition, alkaline metal or alkaline-earth metal hydroxides (e.g., NaOH, KOH, etc.) or similar bases may also be used to raise the pH and to initiate the crosslinking if the fluids already include divalent or polyvalent ions.

Although unexpected, embodiments of the invention clearly show that the order of addition of various components may have a significant impact on the ultimate viscosities of the resultant fluids. It is preferred that the salts (e.g., $CaBr_2$ or NaBr) be added after the acid has been added. Otherwise, the fluids may not achieve the desired viscosities. If the salts (or brines) were to be added before the addition of acid, the salt solutions or brines should be adjusted to an acidic pH range (i.e., pH <7) before mixing with the viscosifying polymer (e.g., DDHEC).

While the above examples illustrate the procedures for preparing embodiments of the invention on a laboratory scale, these procedures are typically modified in field application. The following illustrates one example of how to prepare an annular fluid on location according to embodiments of the present invention. Prior to emplacement, an annular fluid using, for example, the DDHEC polymer as the viscosifier additive, may be prepared as follows:

1. Before use, all DDHEC polymer slurry pails are stirred to thoroughly re-disperse any settled polymer into the slurry. The slurry preferably is stirred until it is smooth and its color is uniform before adding to a completion fluid or other fluids.

2. The required volumes of glycol, brine, fluid, and/or fresh water are loaded into the blender. Stock fluid is preferred because iron contamination can impede polymer hydration. Any dry salts needed for preparing the required fluid are added at this time and allowed to fully dissolve. The fluid is warmed to between 60° F. and 80° F. Fluid temperatures below 60° F. will slow hydration of the polymer and can delay crosslinking.

3. The pH of the completion fluid is checked and, if necessary, adjusted with lime or hydrochloric acid to between 5-7.

4. The DDHEC polymer slurry is added into the blender over the top. A typical dosage is one ~5.4 gallon pail (~50 lb) per 3 bbl fluid.

5. The circulation and agitation is continued for 10 minutes to thoroughly disperse the slurry before adding hydrochloric acid. Then the pH of the mixture is adjusted to the 1-2 range with 26% hydrochloric acid. About ½ gallon of acid per 3 bbl fluid is added at a time and mixed for at least 5 minutes before checking pH or proceeding with further additions. The use of excessive acid can lessen the overall longevity of the polymer.

6. If foaming or aeration of gel is excessive, a small amount of defoaming additive may be added to eliminate the foam.

7. When the mixture develops some viscosity (about 20-30 cP), circulation through the centrifugal pump may be discontinued, but slow agitation with the paddle is continued. Extended circulation through the centrifugal pump can break down polymer backbone due to excessive shear stress—and/or due to the combined stress of very low pH and high shear—and lessen the overall longevity of the polymer. The mixture is allowed to hydrate until fully yielded (hydrated), as evidenced by no further visual change of the gel viscosity in the blender. The final viscosity is typically about 160 to 240 cP, depending on fluid and temperature. In some cases, hydration should be complete within 20 to 90 minutes, especially with fluids having substantial amounts of free water; for other fluids, especially those having a higher glycol content, hydration may take longer.

8. While allowing the polymer in the mixture to hydrate, the magnesium oxide is prepared for addition to the mixture. The recommended magnesium oxide loading is about 1 lb/bbl of gelled fluid. For non-calcium-based fluids or application temperatures above 200° F., 1.25 lb/bbl of magnesium oxide is recommended. Using a small container such as a 5-gallon bucket, the required amount of the magnesium oxide is mixed into 11.6 ppg $CaCl_2$ brine at 10 lbs/3 gal.

9. The magnesium oxide/fluid slurry is preferably used within 2 hours after mixing. Otherwise, it will harden if stored for later use.

10. Once the DDHEC polymer is fully hydrated, the gel is circulated through the eductor port on the top of the blender. While circulating, the magnesium oxide slurry is slowly added into the blender through the eductor port. The jetting action of the circulating gel helps to evenly disperse the magnesium oxide slurry. If sufficient crosslinking has not begun to occur within 15 minutes, slurry an additional ¼ lb./per bbl. of the magnesium oxide for addition to the mixture through the eductor port.

At this time, when some viscosity has developed, but well before a substantial fraction of the fluid has had an opportunity to crosslink, the mixture is ready for emplacement. Once significant crosslinking has occurred, the product will become much more difficult to pump. Therefore, to avoid any danger of having the mixture "lock-up" in the well and in the piping leading to the annulus into which it is to be emplaced, the crosslinking process should not be initiated (by the addition of the magnesium oxide) until timing is appropriate for prompt placement of the mixture.

Crosslink time is influenced by several factors including:
a. Fluid Type
   High glycol content fluids crosslink more slowly.
   High alcohol, alcohol-ether, or polyol content fluids crosslink more slowly.
   Calcium-based brines crosslink more quickly, decreasing crosslink time.
   Increased density decreases crosslink time for calcium brines.
b. Temperature
   Warmer fluids will crosslink more quickly.
c. The Magnesium Oxide Concentration
   Increasing the magnesium oxide concentration decreases crosslink time.

Once the fluid is emplaced in the desired location in the annulus of the well, any excess fluid in connecting piping, valves, manifolds, etc., should be displaced before the fluid has had time enough to thoroughly crosslink. After the fluid has been emplaced in the annulus and given sufficient time to crosslink, the fluid will remain essentially free of convective currents that are responsible for convective heat-loss through the annulus. The only remaining heat-loss avenues are radiative heat-loss, which is ordinarily negligible in magnitude, and conductive heat-loss, which is minimized through the selection of a low-thermal-conductivity base fluid for the mixture.

After the fluid has been emplaced in the annulus, there may be circumstances that require intervention—a work-over is needed, a pipe collapses, develops a leak, or parts, etc. If this should happen, a method for external breaker addition is provided through which the emplaced crosslinked fluid may be broken and removed so that the intervention can take place without the interfering presence of remnant crosslinked fluid. This method entails washing 10-15% hydrochloric acid through the crosslinked fluid. A suitable amount of hydrochloric acid for the washing may depend on several factors; an exemplary amount is about 25 gallons of hydrochloric acid per foot of zone. The application of the dilute hydrochloric acid lowers the pH of the mixture into a pH range where the crosslinking is no longer effective, and whereupon the fluid breaks. Thereafter, the remaining fluid can be circulated out of the well bore.

Hydrochloric acid can be spotted upon or atop the crosslinked fluid instead, but this method requires a much longer break time. Several days may be required to fully break the mixture if diffusion is relied upon to distribute the hydrochloric acid to break through the crosslinked fluid.

The example discussed above describes a crosslinking and un-crosslinking (breaker) mechanism which is controlled by a pH swing. Other methods of effecting the same result—for example, applying a mildly complexed crosslinkant which becomes slowly un-complexed in order to effect the initial crosslinking, and subsequently applying a stronger complexing additive to effect the breaking (un-crosslinking)—will be obvious to one skilled in the art. Furthermore, other means of breaking the viscosity, such as, for example, the application of an oxidizing breaker like lithium hypochlorite or sodium chlorite or the application of a combination of an oxidizing breaker and acid, will be obvious to one skilled in the art.

Thus, the present invention advantageously discloses novel compositions for use as insulating packer fluids and methods for emplacing the same. Insulating packer fluids are designed to reduce heat loss due to conduction and convection when emplaced in the annular space in an oil or gas well or to assist in reducing heat loss due to conduction and convection when emplaced in one of the annular spaces in an oil or gas well.

In contrast, conventional insulating packer fluids reduce conductive heat loss primarily by being formulated from base fluids that have inherently low coefficients of thermal conductivity, and they reduce convective heat loss primarily by being formulated with viscosifying additives that are so viscous from the very beginning, once the fluid is fully formulated, and throughout the useful life of the fluid, that convection currents are arrested or substantially diminished. However, conventional insulating packer fluids often cannot achieve the lowest inherent heat loss because of other constraints on the composition or properties of the fluid, for example, that it be non-hydrocarbon-based for environmental reasons or for compatibility with elastomer elements present in the wellbore, or that it be sufficiently low in viscosity that the horsepower requirements for pumping at a reasonable rate do not exceed the capacities of available pumping means.

Furthermore, conventional insulating packer fluids often cannot comprise viscosifying additives that are so viscous that convection currents are arrested or substantially diminished because such viscosified fluids become too viscous to pump with available power supplies, pumping means, flow lines, connectors, and other associated hardware.

Embodiments of the present invention advantageously provide insulating packer fluids that are very low in thermal conductivity while simultaneously meeting all of the other constraints imposed upon the packer fluid. Preferred embodiments of the present invention are based on compositions that are 25 to 100% ethylene glycol (or other suitable chemicals having the requisite properties described above).

In addition, embodiments of the present invention are easier to pump yet become more viscous than conventional fluids when the insulating packer fluids are resident in situ within the annular space or one of the annular spaces in an oil or gas well. This is accomplished by incorporating a crosslinkable viscosifying additive into the novel compositions taught herein. Other compositions in accordance with the present invention comprise blends of conventional insulating packer fluids with those that include crosslinkable viscosifying additives.

While reference has been made to a limited number of crosslinkable viscosifying agents for use in a low thermal conductivity medium, it is expressly within the scope of the present invention that a variety of polymers and crosslinking agents may be used. Typical brine-based well fluid viscosifying additives include natural and synthetic polymers and oligomers. The viscosifying additives suitable for embodiments of the present invention include poly(ethylene glycol) (PEG), poly(diallyl amine), poly(acrylamide), poly(aminomethylpropyl-sulfonate [AMPS]), poly(acrylonitrile), poly(vinyl acetate), poly(vinyl alcohol), poly(vinyl amine), poly(vinyl sulfonate), poly(styryl sulfonate), poly(acrylate), poly (methyl acrylate), poly(methacrylate), poly(methyl methacrylate), poly(vinylpyrrolidone), poly(vinyl lactam), and co-, ter-, quater-, and quinque-polymers of the following co-monomers: ethylene, butadiene, isoprene, styrene, divinylbenzene, divinyl amine, 1,4-pentadiene-3-one (divinyl ketone), 1,6-heptadiene-4-one (diallyl ketone), diallyl amine, ethylene glycol, acrylamide, AMPS, acrylonitrile, vinyl acetate, vinyl alcohol, vinyl amine, vinyl sulfonate, styryl sulfonate, acrylate, methyl acrylate, methacrylate, methyl methacrylate, vinylpyrrolidone, vinyl lactam, vinyl phosphonate, bis-(β-chloroethyl vinyl phosphonate) {also known as bis(2-chloroethyl) vinylphosphonate}, bis (hydrocarbyl) vinylphosphonate, 1,1-dichlorovinylethyl phosphate, 1,1-dichlorovinylethyl phosphate, triethanolamino-bis-chlorophosphoric acid, hydrophilic monomers of the formula I

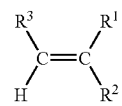

wherein $R^1$ is hydrogen, methyl or ethyl, $R^2$ is the group —COOR$^4$, the sulfonyl group, the phosphonyl group, the phosphonyl group esterified by $(C_1\text{—}C_4)$-alkanol or a group of the formula

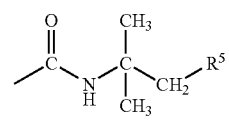

wherein $R^3$ is hydrogen, methyl, ethyl or the carboxyl group, $R^4$ is hydrogen, amino or hydroxy-$(C_1\text{—}C_4)$-alkyl and $R^5$ is the sulfonyl group, the phosphonyl group or the carboxyl group, or grafting (co)polymerization of one or more hydrophilic monomers of the formula I onto a grafting base, using a free radical initiator which forms three or more free radical sites per molecule, or monomers of the formula II:

where X is H, alkali metal or ammonia, Y and Z are each H, $PO_3X_2$, $SO_3X$ or $CO_2X$ (e.g., vinyl phosphonic acid or vinylidene diphosphonic acid) or groups which react with hypophosphorous acid in the presence of free radicals providing compounds $X_2O_3PCHYCZ_2PO_2XH$ which react with monomers such as vinyl sulfonate, vinylphosphonate, vinylidene diphosphonate and acrylic acid.

The viscosifying additives suitable for embodiments of the present invention also include "natural" polymers onto which have been grafted one or more co-, ter-, and quater-monomers of the following: ethylene, butadiene, isoprene, styrene, divinylbenzene, divinyl amine, 1,4-pentadiene-3-one (divinyl ketone), 1,6-heptadiene-4-one (diallyl ketone), diallyl amine, ethylene glycol, acrylamide, AMPS, acrylonitrile, vinyl acetate, vinyl alcohol, vinyl amine, vinyl sulfonate, styryl sulfonate, acrylate, methyl acrylate, methacrylate, methyl methacrylate, vinylpyrrolidone, vinyl lactams, vinyl phosphonate, bis-(β-chloroethyl vinyl phosphonate) {also known as bis(2-chloroethyl) vinylphosphonate}, bis(hydrocarbyl) vinylphosphonate, 1,1-dichlorovinylethyl phosphate, 1,1-dichlorovinylethyl phosphate, triethanolamino-bis-chlorophosphoric acid, hydrophilic monomers of the formula I

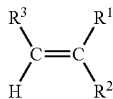

wherein $R^1$ is hydrogen, methyl or ethyl, $R^2$ is the group —$COOR^4$, the sulfonyl group, the phosphonyl group, the phosphonyl group esterified by $(C_1—C_4)$-alkanol or a group of the formula

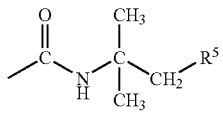

wherein $R^3$ is hydrogen, methyl, ethyl or the carboxyl group, $R^4$ is hydrogen, amino or hydroxy-$(C_1—C_4)$-alkyl and $R^5$ is the sulfonyl group, the phosphonyl group or the carboxyl group, or grafting (co)polymerization of one or more hydrophilic monomers of the formula I onto a grafting base, using a free radical initiator which forms three or more free radical sites per molecule, or monomers of the formula II:

$X_2O_3PCHYCZ_2PO_2XH$ where X is H, alkali metal or ammonia, Y and Z are each H, $PO_3X_2$, $SO_3X$ or $CO_2X$ (e.g., vinyl phosphonic acid or vinylidene diphosphonic acid) or groups which react with hypophosphorous acid in the presence of free radicals providing compounds $X_2O_3PCHYCZ_2PO_2XH$ which react with monomers such as vinyl sulfonate, vinylphosphonate, vinylidene diphosphonate and acrylic acid.

Suitable crosslinking agents in accordance with the present invention include (1) "crosslinking agents active upon vicinal diol groups", i.e., a borate, titanate, or zirconate crosslinkants as taught in U.S. Pat. No. 5,062,969, (2) divalent, trivalent, or tetravalent cations such as, for example, $Fe^{2+}$, $Cd^{2+}$, $Co^{2+}$, $Ca^{2+}$, $Cu^{2+}$, $UO_2^{2+}$, $PbO^{2+}$, $Al^{3+}$, $Fe^{3+}$, $Cr^{3+}$, $Ce^{3+}$, $Ti^{4+}$, $Zr^{4+}$, $Sn^{4+}$, and the like, (3) complexes of or other moieties containing the crosslinkants listed above in the first two categories, such as, for example, the tetrammine complex of the $Cu^{2+}$ cation, the carbonate anion complexes of the $UO_2^{2+}$ cation, $UO_2(CO_3)_2^{2-}$ and $UO_2(CO_3)_3^{4-}$, or the triethanolamine complex of the $Ti^{4+}$ cation, (4) so-called "organic crosslinkants" such as, for example, formaldehyde, and glutaraldehyde, and (5) mixtures of the crosslinkants listed above in the first four categories and/or reaction products therefrom.

Furthermore, it will be clear to one of ordinary skill in the art that other brine solutions, such as $ZnCl_2$, $CaCl_2$, $CaBr_2$, $ZnBr_2$, $NaHCO_2$, $KHCO_2$, $CsHCO_2$, NaCl, KCl, $NH_4Cl$, $MgCl_2$, seawater, NaBr, KBr, CsBr, and combinations thereof may be used in connection with the present invention.

Furthermore, while the foregoing embodiments reference a limited number of water miscible low thermal conductivity compounds as the base fluid, one of ordinary skill in the art will recognize that chemical compounds having the same general characteristics also will function in an analogous fashion. For example, it is expressly within the scope of the present invention that other compounds containing primary, secondary, or tertiary alcohols may be used, such as, diethylene glycol, triethylene glycol, and other glycol derivatives like diethylene glycol methylether, diethylene glycol ethylether, triethylene glycol methylether, and triethylene glycol ethylether, glycerol and glycerol derivatives like glycerol formal, glycerol 1,3 diglycerolate, glyceroethoxylate, 1,6, hexandiol, and 1,2 cyclohexandiol.

In contrast to the prior art, embodiments of the present invention disclose making an annular fluid as thick as possible prior to crosslinking so that the fluid is readily pumpable. Further, embodiments of the present invention disclose subsequently adding a crosslinking activator during the process of pumping the fluid so that the fluid will not gain viscosity due to crosslinking while the fluid is being pumped, but will gain viscosity to a very substantial extent later when the fluid is resident in situ within the annular space or one of the annular spaces in an oil or gas well. Therefore, embodiments of the present invention advantageously provide an annular fluid that controls annular heat loss due to convection and to conduction.

Further, while reference has been made to the addition of crosslinking "promoters," it is expressly within the scope of the present invention to use fluids having a thermal conductivity of no more than about 0.25 btu/(hr·ft·° F.), which include a water-miscible solvent and a viscosifying additive, wherein the packer fluid has an inherent capability to substantially increase its viscosity upon sitting for a selected period of time. In certain embodiments, therefore, low thermal conductivity fluids may be used that viscosify simply after being emplaced in a well or through other triggering mechanisms known to those in the art.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A packer fluid, comprising:
   a water-miscible solvent, comprising about 50% to about 80% by weight of the packer fluid;
   a viscosifying additive;
   a crosslinking agent having the facility to crosslink the viscosifying additive;
   a crosslinking inhibitor having the facility to inhibit crosslinking between the viscosifying additive and the crosslinking agent; and
   an initiating agent having the facility to overcome an action of the crosslinking inhibitor and to initiate crosslinking between the viscosifying additive and the crosslinking agent,
   wherein the packer fluid has a thermal conductivity of no more than about 0.25 btu/(hr·ft·° F.), and a potential to substantially increase its viscosity upon sitting for a selected period of time; and
   wherein, upon sitting for a selected period of time, the increased packer fluid viscosity and the packer fluid thermal conductivity concurrently reduce convective and conductive heat transfer, wherein the crosslinking inhibitor comprises hydrochloric acid.

* * * * *